United States Patent [19]

Gumb et al.

[11] 3,916,119

[45] Oct. 28, 1975

[54] TELEPHONE SWITCH

[75] Inventors: Beverley William Gumb; Ronald Joseph Morrell; Fredrick Thomas Cogan, all of London, Canada

[73] Assignee: Northern Electric Company Limited, Montreal, Canada

[22] Filed: Nov. 25, 1974

[21] Appl. No.: 526,972

[52] U.S. Cl. .............................................. 179/164

[51] Int. Cl.² .............................................. H04M 1/08

[58] Field of Search ............ 179/100 R, 100 D, 159, 179/164

[56] References Cited

UNITED STATES PATENTS 3,027,432 3/1962 Jordan et al. ........................ 179/164

3,165,597 1/1965 Nordstrom et al. ................. 179/164

*Primary Examiner*—William C. Cooper

*Attorney, Agent, or Firm*—Sidney T. Jelly

[57] ABSTRACT

A switch for a telephone, in particular the switch hook assembly, is adapted to plug in receiving sockets provided in the telephone housing, instead of being attached by screws. The switch is generally of conventional form, with a frame mounted on a base, the base carrying the various contacts. The frame is provided with legs which are inserted into sockets - for example hollow bosses molded as part of the telephone housing. A resilient retaining member can be provided for retaining the assembly in position.

8 Claims, 12 Drawing Figures

TELEPHONE SWITCH

This invention relates to a telephone switch and more particularly to a switch hook assembly for a telephone, and to telephone sets incorporating switch hook assemblies.

A telephone switch hook comprises a series of coöperating contact springs, a card member which acts on the contact springs to selectively make and break contacts, a lever arm which moves the card member and a spring which is biased to return the card member and lever arm to a position-referred to as the on-hook position-that is a position which occurs when the handset is removed from its normal resting place on the telephone set housing.

Such switch assemblies are usually attached to a housing of a telephone set by screws, electrical leads being soldered to the contact springs. Usually short lengths of conductor wire are soldered to the contact springs prior to assembly of a switch, the wires then being led to a connecting block where they are attached by screws, the ends of the wires having space terminals at their end. Thus installing a switch entails connection of several wires or leads after which the switch has to be positioned and held during insertion and tightening of two or more screws into the telephone housing.

The present invention provides a telephone switch which is plugged into the telephone housing. In particular, the switch is attached to the telephone housing by the insertion, or "plugging in", of frame members into receiving recesses formed in the telephone housing. Thus installation is simple. Resilient retaining means may be provided and removal of a switch only requires slight flexing of the retaining member and the switch is then pulled out.

The invention will be readily understood, and various features appreciated, by the following description of an embodiment, by way of example, in conjunction with the accompanying drawings, in which:-

Figures 1, 2, 3, 4, 7, 8, 9:
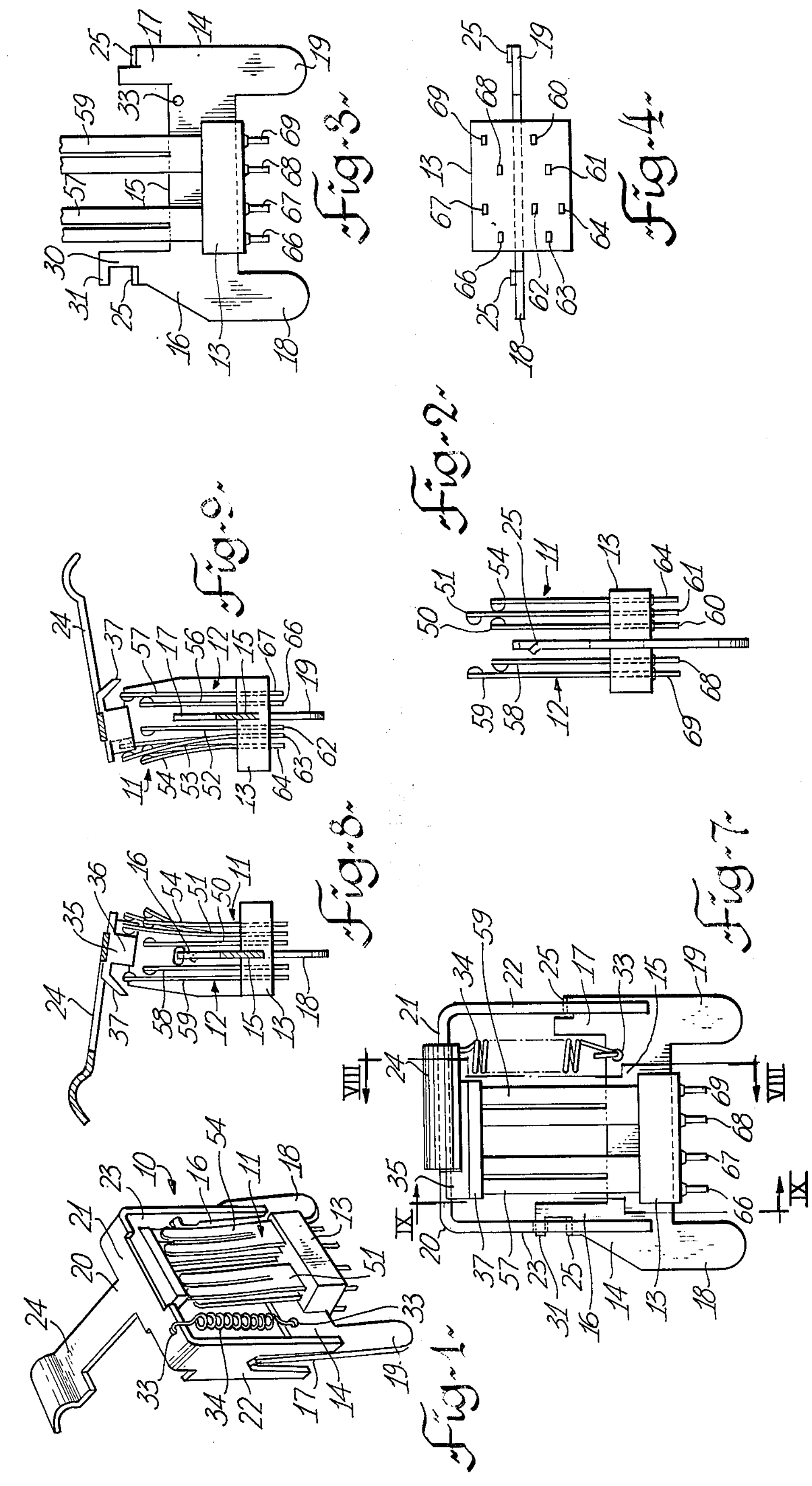
FIG. 1 is a perspective view of a switch.
FIG. 2 is an end view of the switch of FIG. 1 with the lever arm and card member removed to show the base, contact springs and frame.
FIG. 3 is a side view of the switch as in FIG. 2.
FIG. 4 is a base view of the switch as in FIGS. 2 and 3.
FIG. 7 is a side view of the switch assembly of FIG. 1 in the direction of arrow A in FIG. 1.
FIG. 8 is a cross-section on the line VIII—VIII of FIG. 7.
FIG. 9 is a cross-section on the line IX—IX of FIG. 7.

The switch 10 illustrated in the drawings, comprises a plurality of contact springs arranged generally in two groups 11 and 12. The contact springs are mounted in a base 13. Base 13 is conveniently molded about the base parts of the spring contacts and also carries a frame 14. Frame 14 has a cross-member 15 which is attached to the base 13, upwardly extending legs 16 and 17, and downwardly extending legs 18 and 19. Supported on the top ends of legs 16 and 17 is a lever arm 20. Lever arm 20 has a central web 21, two downwardly extending legs 22, 23 and a forward extending arm 24.

The lower ends of legs 22, 23 of lever arm 20 are bifurcated and fit over the top ends of the upwardly extending legs 16 and 17 of the frame 14. As seen in FIGS. 2, 3 and 4 a portion 25 of the top edge of legs 16 and 17 is bent over slightly and the ends of the bifurcated portions of legs 22 and 23 pivot on the thin portions 25. One leg-16-of the frame has a short extension 30 having a lateral projection 31. In the corresponding leg 23 of the lever arm a short inclined slot 32 is formed. When the lever arm 20 is resting on the frame 14 the projection 31 registers in the slot 32. In the central web 21 of the lever arm and the crossmember 15 of the frame are holes 33 and a tension spring 34 extends between lever arm and frame the ends of the spring being anchored in the holes 33.

Carried on the central web 21 of the lever arm 20 is a card member 35. Card member 35 has a central portion 36 which extends downwardly beneath the central web 21. A downward extension 37 on one side of the card member acts as a shield over the tops of one group of contact springs -group 12. The groups of spring contacts vary. Group 11 has five spring contacts, two contacts 50 and 51 forming one contact unit and three contacts 52, 53, and 54 forming another contact unit. The contact springs 50 and 51 are bifurcated in the usual way but work together as one unit to make or break a single connection and are biased to be normally in contact. Contact springs 52, 53 and 54 are also bifurcated. Contact springs 53 makes contact with contact springs 52 or with contact springs 54. However the two parts of contact spring 53 acts independently at some positions. There is a local thickening or protrusion 55 on the central portion 36 of the card member 35 which acts on one part, 53*a*, only of contact spring 53 at certain operative positions, as will be explained later. Contact spring 53 is biased to make contact with contact spring 52.

Figure 10:
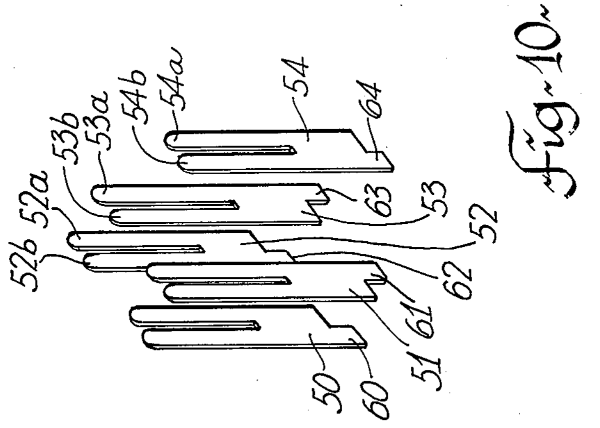
FIG. 10 is a perspective exploded view of one set of contact springs.

Group 12 has four contact springs 56, 57, 58 and 59. Spring contacts 56 and 57 act together as a unit making and breaking one connection. Similarly spring contacts 58 and 59 act as a unit making and breaking one connection. Spring contacts 57 and 59 are biased to make contact with spring contacts 56 and 58. The spring contacts in both groups are actuated by the central portion 36 of the card member 35. The spring contacts 50, 51, 52, 53, 54, 56, 57, 58 and 59 extend through the base 13 and have terminals 60, 61, 62, 63, 64, 66, 67, 68 and 69 respectively projecting downwardly. FIG. 10 is a diagrammatic exploded view of the contact springs forming group 12 and the actuation of the various contacts will be readily seen in conjunction with the following description.

Considering operation of the switch, and starting with the condition that the switch is "on-hook", that is the handset is removed, the spring 34 pivots the lever arm, the lever 24 swinging up and the card member moving to the right as seen in FIG. 8. The central portion 36 of the card member 35 has closed contact springs 53 against contact spring 54, breaking contact between contact springs 53 and 52. Due to the local protrusion 60 on the central portion of the card member contact part 53*a* of contact springs 53 breaks contact with contact part 52*a* and makes contact with contact part 54*a* before contact part 53*b*breaks contact with contact part 52*b* . Eventually part 53*b* breaks contact with contact part 52*b* and makes contact with contact part 54*b* . Thus there is a sequential transfer by contact spring 53 from contact spring 52 to contact spring 54 with contact spring 53 at all times in contact with one or other of contact springs 52 and 54.

Pivoting of the lever arm, and the card member 35 also breaks contact between contact springs 51 and 52. At the same time, the movement of the central portion 36 has permitted contact springs 52 and 59 to move into contact with contact springs 56 and 58 respectively.

Replacing the handset, or otherwise pushing down the arm 24 causes the lever arm 20 to pivot against the spring 34, the card member 35 moving to the left, in FIG. 8. This movement breaks contact between spring contact 56 and 57; and also 58 and 59. Simultaneously, contact springs 50 and 51 make contact and a sequential contact transfer by spring contact 53 occurs. First contact part 53*b*breaks contact with contact part 54*b*and makes contact with contact part 52*b*and then contact part 53*a* breaks contact with contact part 54*a*and makes contact with contact part 52*a*.

The contact springs produce certain loadings on the lever arm 20. Conveniently these loadings and the bias of the spring 34 are arranged so as to be substantially constant during movement of the lever arm from one position to the other, in the known manner.

Figure 12:
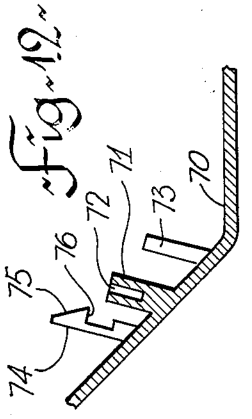
FIG. 12 is a cross-section on the line XII-XII of FIG. 11.
Figure 6:
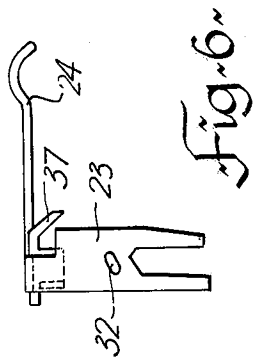
FIG. 6 is an end view of the lever arm and card from the other end.
Figure 11:
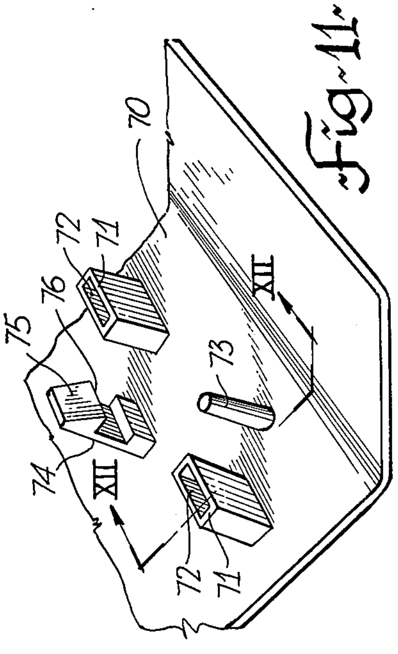
FIG. 11 is a perspective view of one form of mounting in a telephone set for the switch of FIG. 1.
Figure 5:
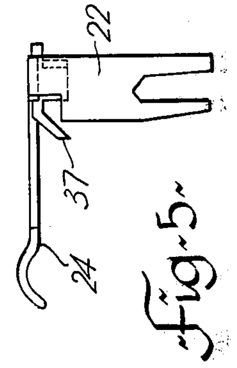
FIG. 5 is an end view of the lever arm and card from one end.

The downwardly extending legs 18 and 19 provide attachment means for mounting the switch on a telephone housing. FIGS. 11 and 12 illustrate one form of mounting in a telephone housing base 70. Two rectangular hollow bosses 71 are molded as part of the telephone housing base, the slots 72 in the bosses 71 of a size and shape to accept the legs 18 and 19. The bosses are spaced apart the same distances as the legs 18 and 19. Slightly forward of the bosses 71 is a solid boss 73, and slightly rearward of the bosses 71 is an upwardly extending retaining member 74. When a switch 10 is mounted by pushing legs 18 and 19 into the slots 72 of the bosses 71, the bottom surface of the base member 13 rests on the top of the boss 73. As the switch is pushed down the rear edge of the boss 13 slides down the inclined face 75 of the retaining member 74 flexing it rearward slightly, until the switch is right down, when the lip 76 engages over the top surface of the base member 13. To remove the switch the retaining member is first flexed rearward slightly to disengage the lip 67 from engagement with the base member 13.

Connections are made to the terminals 60, 61, 62, 63, 64, 66, 67, 68 and 69 by soldering electrical conductors (not shown) thereto. It is also possible to provide a connector block into which the terminals 60 to 69 can be pushed, the connecting block either being attached to the switch when the switch is mounted on the housing, or the connecting block can be positioned on the housing between bosses 71 and 73 and retaining member 74 before mounting of the switch. Mounting of the switch will also cause the terminals to connect with the connector block.

What Is Claimed Is:

1. A telephone switch comprising:

a frame including a planar cross member, spaced apart downwardly extending legs and spaced apart upwardly extending legs, said legs substantially in the same plane as said cross member, a base mounted on said cross member;

a lever arm pivotally mounted on said upwardly extending legs;

a plurality of contact members mounted on said base;

a card member on said lever arm, said card member operative to make and break contacts between selected pairs of said contact members on pivoting of said lever arm;

resilient means urging said lever arm to a predetermined pivotal position on said frame, said downwardly extending legs adapted to be inserted in cooperative recesses formed in said telephone housing.

2. A telephone switch as claimed in claim 1, said contact members arranged in two groups, a group on each side of said planar crossmember;

said card member pivotal from one pivot position to another, and engaging one group of contact members in one pivotal position and engaging the other group of contact members in the other pivotal position.

3. A telephone switch as claimed in claim 1, said lever arm including spaced apart downwardly extending legs, the lower ends of said legs of said lever arm bifurcated, the bifurcated parts fitting over the upper ends of said upwardly extending legs of said frame and pivotal thereon.

4. A telephone switch as claimed in claim 3, including an upwardly extending extension on the upper end of one of said upwardly extending legs of said frame and a lateral projection on said extension, and a hole in the related downwardly extending leg of said lever arm, the lateral projection positioned in said hole.

5. A telephone switch as claimed in claim 4, said hole a slot extending in a lateral direction across said leg.

6. A telephone switch as claimed in claim 1, said contact members extending through said base and terminals formed on the ends of said contact members.

7. A telephone set comprising:

a housing and a hook switch mounted on said housing, said hook switch comprising:

a frame including a planar cross member, spaced apart downwardly extending legs and spaced apart upwardly extending legs, said legs in planes substantially parallel to the plane of said planar cross member;

a base mounted on said cross member;

a lever arm pivotally mounted on said upwardly extended legs;

a plurality of contact members mounted on said base;

a card member on said lever arm, said card member operative to make and break contacts between selected pairs of said contact members on pivoting of said lever arm;

and resilient means urging said lever arm to a predetermined pivotal position on said frame;

said housing including spaced apart recesses positioned for the reception of said downwardly extending legs of said hook switch.

8. A telephone set as claimed in claim 7, including a resilient retaining member to retain said hook switch in position in said housing, said retaining member comprising an upwardly extending member having an enlarged portion at its upper end, said enlarged portion including a downwardly and outwardly inclined face, and a lip beneath said inclined face, the arrangement such that on insertion of the downwardly extending legs in said recesses in said housing, said base of said hook switch moves down said downwardly and outwardly inclined face flexing said retaining member, said lip engaging over said base when said hook switch is completely inserted.

* * * * *